US008852809B2

United States Patent
Sheem et al.

(10) Patent No.: US 8,852,809 B2
(45) Date of Patent: Oct. 7, 2014

(54) POSITIVE ELECTRODE FOR RECHARGEABLE LITHIUM BATTERY WITH HIGH VOLTAGE AND RECHARGEABLE LITHIUM BATTERY INCLUDING SAME

(75) Inventors: Kyeu-Yoon Sheem, Yongin-si (KR); Bok-Hyun Ka, Yongin-si (KR); Sumihito Ishida, Yongin-si (KR); Da-Woon Han, Yongin-si (KR); Eui-Hwan Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 661 days.

(21) Appl. No.: 13/094,717

(22) Filed: Apr. 26, 2011

(65) Prior Publication Data
US 2012/0003534 A1 Jan. 5, 2012

(30) Foreign Application Priority Data
Jul. 2, 2010 (KR) .................... 10-2010-0063964

(51) Int. Cl.
| H01M 4/00 | (2006.01) |
| H01M 4/58 | (2010.01) |
| H01M 4/62 | (2006.01) |
| H01M 10/052 | (2010.01) |
| H01M 4/66 | (2006.01) |
| H01M 4/131 | (2010.01) |
| H01M 10/42 | (2006.01) |

(52) U.S. Cl.
CPC ............ *H01M 4/131* (2013.01); *H01M 10/052* (2013.01); *H01M 2010/4292* (2013.01); *H01M 4/663* (2013.01); *Y02E 60/122* (2013.01)
USPC ..................... 429/231.8; 429/209; 429/218.1; 429/232; 423/138; 423/364; 423/448; 423/445 R

(58) Field of Classification Search
USPC ......... 429/188, 189, 301–347, 199–207, 208, 429/209–246; 29/623.1–623.5; 252/182.1, 252/500
See application file for complete search history.

(56) References Cited

U.S. PATENT DOCUMENTS

| 6,517,972 B1 | 2/2003 | Amatucci |
| 2004/0033419 A1* | 2/2004 | Funabiki .................... 429/218.1 |
| 2006/0127771 A1 | 6/2006 | Yamaki et al. |

(Continued)

FOREIGN PATENT DOCUMENTS

| CN | 1692522 A | 11/2005 |
| CN | 101300651 A | 11/2008 |

(Continued)

OTHER PUBLICATIONS

Extended European Search Report dated Nov. 7, 2011 for EP application 11170602.4, 6 pages.

(Continued)

*Primary Examiner* — Basia Ridley
*Assistant Examiner* — Caitlin Wilmot
(74) *Attorney, Agent, or Firm* — Christie, Parker & Hale, LLP

(57) ABSTRACT

A positive electrode for a rechargeable lithium battery capable of providing a high voltage and a high voltage rechargeable lithium battery including the same, wherein the positive electrode includes a positive active material and a capacitor-reactive carbonaceous material having a specific surface area at or between 10 m²/g and 100 m²/g.

18 Claims, 1 Drawing Sheet

(56) References Cited

U.S. PATENT DOCUMENTS

| | | |
|---|---|---|
| 2008/0199777 A1 | 8/2008 | Onishi et al. |
| 2009/0023072 A1 | 1/2009 | Yanagi et al. |
| 2009/0197168 A1 | 8/2009 | Nishida et al. |
| 2010/0099030 A1 | 4/2010 | Nishida et al. |
| 2010/0233541 A1* | 9/2010 | Sano .............................. 429/221 |

FOREIGN PATENT DOCUMENTS

| | | |
|---|---|---|
| CN | 101395743 A | 3/2009 |
| EP | 1 950 779 A1 | 7/2008 |
| EP | 1 990 850 A1 | 11/2008 |
| JP | 04-355057 | 12/1992 |
| JP | 5-159773 A | 6/1993 |
| JP | 05-251290 | 9/1993 |
| JP | 2000-272911 A | 10/2000 |
| JP | 2004-319463 | 11/2004 |
| JP | 2005-259378 A | 9/2005 |
| JP | 2006-172778 A | 6/2006 |
| JP | 2006-185792 | 7/2006 |
| JP | 2008-34215 A | 2/2008 |
| JP | 2008-181732 | 8/2008 |
| JP | 2008-251965 A | 10/2008 |
| KR | 10-0693115 | 3/2007 |
| KR | 10-2008-0029479 | 4/2008 |
| KR | 10-2009-0027885 A | 3/2009 |
| WO | WO 2008/088050 A1 | 7/2008 |

OTHER PUBLICATIONS

Machine English Translation of JP 5-159773 A (5 pages).
Machine English Translation of JP 2000-272911 A (28 pages).
Machine English Translation of JP 2005-259378 A (15 pages).
Machine English Translation of JP 2008-34215 A (21 pages).
Machine English Translation of JP 2008-251965 A (29 pages).
Park, Jung-kil, *Effect of Adding Carbonaceous Materials on Cathode Materials for Lithium Secondary Batteries*, Department of Metallurgical Engineering, Graduate School Kumoh National Institute of Technology, Nov. 29, 2006, with English abstract, (91 pages).
Chinese Office Action, Jun. 28, 2013, Issued in Patent Application No. 201110174260.7, 13 Pages.

* cited by examiner

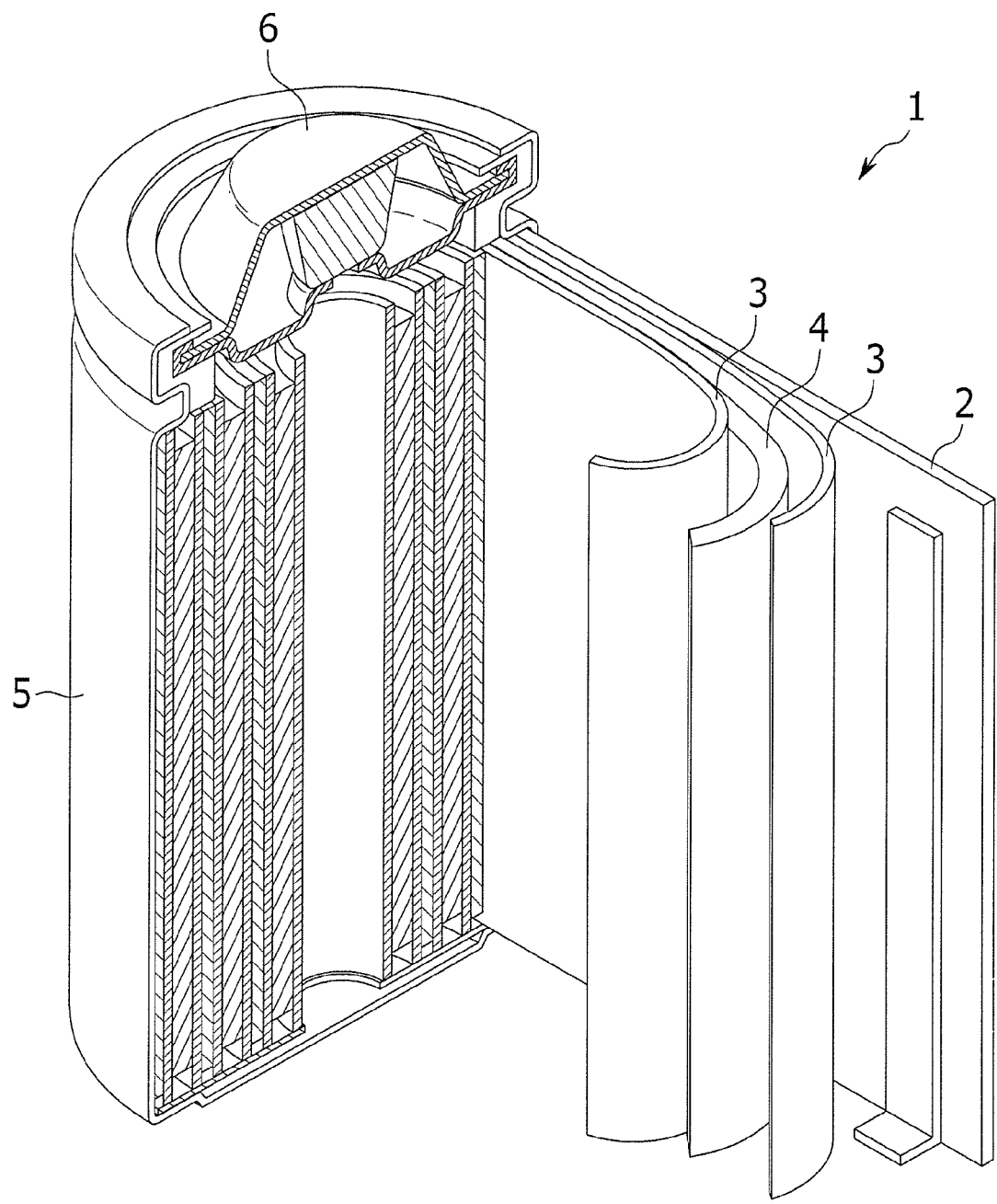

POSITIVE ELECTRODE FOR RECHARGEABLE LITHIUM BATTERY WITH HIGH VOLTAGE AND RECHARGEABLE LITHIUM BATTERY INCLUDING SAME

CROSS-REFERENCE TO RELATED APPLICATION

This application claims priority to and the benefit of Korean Patent Application No. 10-2010-0063964, filed in the Korean Intellectual Property Office on Jul. 2, 2010, the entire content of which is incorporated herein by reference.

BACKGROUND

1. Field

This following description relates to a positive electrode for a rechargeable lithium battery capable of providing a high voltage and a rechargeable lithium battery including the same.

2. Description of the Related Art

An energy storage device based on an electrochemical reaction includes two electrodes, an electrolyte that transfers ions, and a separation film. The electrochemical reaction of the energy storage device is mostly a surface reaction occurring on the surface of an electrode, and is a non-uniform reaction.

The reaction may be categorized as (1) a mass transfer reaction where chemical species dissociated from the electrolyte are transferred to the surface of an electrode; (2) a non-faradaic reaction, which is an adsorption/desorption reaction where the transferred chemical species form a kind of electric double layer on the surface of an electrode; or (3) a faradaic reaction.

Herein, the reaction species may have a non-faradaic reaction in which the chemical species from the electrolyte form an electrical double layer on the electrode surface and they are desorbed, or a faradaic reaction in which they are directly provided with electrons and oxidized (or reduced).

An example of an energy storage unit using the non-faradaic reaction is a super capacitor (or electric bilayer capacitor). An example of an energy storage unit using the faradaic reaction is a lithium rechargeable battery. In order to improve power of a rechargeable lithium battery, a method to add power-enforcing material (capacitor component) to a negative electrode or a positive electrode, or both a negative electrode and a positive electrode, has been suggested. However, this approach has not yet reached a sufficient level.

SUMMARY

An aspect of an embodiment of the present invention is directed toward a positive electrode for a rechargeable lithium battery capable of providing high voltage with improved power and capacity.

An aspect of an embodiment of the present invention is directed toward a high voltage rechargeable lithium battery including the positive electrode.

According an embodiment, a positive electrode for a rechargeable lithium battery is provided to include a positive active material; and a capacitor-reactive carbonaceous material having a specific surface area at or between 10 m²/g and 100 m²/g.

In one embodiment, the capacitor-reactive carbonaceous material shows a peak at $2\theta=23°\pm5.0°$ and a peak at $2\theta=26.5°\pm1.0°$, and wherein the peak at $2\theta=23°\pm5.0°$ is higher than the peak at $2\theta=26.5°\pm1.0°$.

In one embodiment, the capacitor-reactive carbonaceous material has a height ratio (b/a) at or between 0.01 and 0.99, wherein b is a peak height at $2\theta=26.5°\pm1.0°$ and a is a peak height at $2\theta=23°\pm5.0°$.

In one embodiment, the capacitor-reactive carbonaceous material has interplanar spacing d002 at or between 0.34 nm and 0.8 nm when its X-ray diffraction is measured using a CuKα ray.

In one embodiment, the capacitor-reactive carbonaceous material has a tap density at or between 0.5 g/cc and 1.5 g/cc.

In one embodiment, the positive active material and the capacitor-reactive carbonaceous material are mixed in a weight ratio at or between 99:1 and 50:50.

In one embodiment, the capacitor-reactive carbonaceous material is natural graphite, artificial graphite, mesophase carbon microbeads, or a combination thereof.

In one embodiment, the high voltage rechargeable lithium battery has an operation voltage at 4.5V or more.

In one embodiment, the high voltage rechargeable lithium battery has a working voltage at or between 4.5V and 5.0V.

According an embodiment, a high voltage rechargeable lithium battery is provided to include a positive electrode comprising a positive active material and a capacitor-reactive carbonaceous material having a specific surface area at or between 10 m²/g and 100 m²/g; a negative electrode; and an electrolyte between the positive electrode and the negative electrode.

In one embodiment, the capacitor-reactive carbonaceous material shows a peak at $2\theta=23°\pm5.0°$ and a peak at $2\theta=26.5°\pm1.0°$, and wherein the peak at $2\theta=23°\pm5.0°$ is higher than the peak at $2\theta=26.5°\pm1.0°$.

In one embodiment, the capacitor-reactive carbonaceous material has a height ratio (b/a) at or between 0.01 and 0.99, wherein b is a peak height at $2\theta=26.5°\pm1.0°$ and a is a peak height at $2\theta=23°\pm5.0°$.

In one embodiment, the capacitor-reactive carbonaceous material has interplanar spacing d002 at or between 0.34 nm and 0.8 nm when its X-ray diffraction is measured using a CuKα ray.

In one embodiment, the capacitor-reactive carbonaceous material has a tap density at or between 0.5 g/cc and 1.5 g/cc.

In one embodiment, the positive active material and the capacitor-reactive carbonaceous material are mixed in a weight ratio at or between 99:1 and 50:50.

In one embodiment, the capacitor-reactive carbonaceous material is natural graphite, artificial graphite, mesophase carbon microbeads, or a combination thereof.

In one embodiment, the high voltage rechargeable lithium battery has an operation voltage at 4.5V or more.

In one embodiment, the high voltage rechargeable lithium battery has a working voltage at or between 4.5V and 5.0V.

The positive electrode according to one or more embodiments provides a high voltage rechargeable lithium battery having improved output characteristics and capacity characteristics.

BRIEF DESCRIPTION OF DRAWING

The accompanying FIGURE, together with the specification, illustrate exemplary embodiments of the present invention, and, together with the description, serve to explain the principles of the present invention.

In more detail, the accompanying FIGURE is a schematic view illustrating a rechargeable lithium battery according to an embodiment of the present invention.

DETAILED DESCRIPTION

Exemplary embodiments of this disclosure will hereinafter be described in detail. However, these embodiments are only exemplary, and this disclosure is not limited thereto.

Recently, research on adding a capacitor component of active carbon into a positive electrode has been performed to improve low temperature performance of a rechargeable lithium battery. In this regard, one aspect of the present invention is to improve battery power by adding a carbonaceous material into a positive electrode.

The positive electrode according to one embodiment includes a positive active material and a capacitor-reactive carbonaceous material having a specific surface area of 10 $m^2/g$ to 50 $m^2/g$. In the specification, the capacitor-reactive carbonaceous material indicates a material having a capacitive behavior and that is capable of intercalating and deintercalating lithium ions as well as being capable of adsorbing and desorbing lithium ions, wherein the capacity expressed by the adsorption/desorption is higher than the capacity expressed by the intercalation/deintercalation.

The positive electrode is used for a high voltage rechargeable lithium battery, and it is particularly useful for a high voltage rechargeable lithium battery at an operation voltage of 4.5V or more, and, in one embodiment, at the operation voltage at or between 4.5V and 5.0V (or of 4.5V to 5.0V). In one embodiment, if the capacitor-reactive carbonaceous material is used in a low voltage battery of less than 4.5V (vs. Li/Li$^+$, based on positive electrode), the negative ions (e.g., $PF_6^-$) of a lithium salt are too large to intercalate lithium ions, so it does not provide desirable effects.

In one embodiment, the capacitor-reactive carbonaceous material has a specific surface area at or between 10 $m^2/g$ and 100 $m^2/g$ (or of about 10 $m^2/g$ to about 100 $m^2/g$). In one embodiment, when the capacitor-reactive carbonaceous material has a specific surface area of less than 10 $m^2/g$, the capacity expressed by the absorption/desorption is too little to expect its functions and to satisfactorily control the interplanar spacing, such that the ion intercalation potential is increased due to the narrow interplanar spacing. Thereby, it is difficult to expect the effects from using the carbonaceous material with controlled interplanar spacing. On the other hand, in another embodiment, when the capacitor-reactive carbonaceous material has a specific surface area of more than 100 $m^2/g$, the surface area is increased, and the area contacting the electrolyte solution is also increased to activate the electrolyte solution decomposition reaction, and the moisture becomes excessive so that gas generation due to the moisture decomposition is excessively increased.

Since the capacitor-reactive carbonaceous material has a very small specific surface area compared to the active carbon (1000 $m^2/g$ to 3500 $m^2/g$), the area contacting the electrolyte is also small so as to suppress the electrolyte decomposition reaction. In addition, the specific surface area is small enough to prevent or to reduce or to minimize the adsorption of moisture, so it is easy to control. Furthermore, the small specific area may prevent the problems caused by the gas generation in a battery through the reaction of lithium ions with moisture, which are caused by using the moisture-absorbed material for a capacitor-reactive carbonaceous material.

The capacitor-reactive carbonaceous material shows peaks at $2\theta=23°\pm5.0°$ and $2\theta=26.5°\pm1.0°$ when its X-ray diffraction (XRD) is measured in the (002) plane (the (002) crystal plane) using a CuKα-ray, wherein the height of the peak at $2\theta=23°\pm5.0°$ is higher than the height of the peak at $2\theta=26.5°\pm1.0°$. In addition, the capacitor-reactive carbonaceous material has a height ratio (b/a) at or between 0.01 and 0.99 (or of about 0.01 to about 0.99), wherein b is the height of the peak at $2\theta=26.5°\pm1.0°$, and a is the height of the peak at $2\theta=23°\pm5.0°$.

In one embodiment, when a carbonaceous material having a higher peak at $2\theta=23°\pm5.0°$ than a peak at $2\theta=26.5°\pm1.0$, the carbonaceous material has expected resistance decreasing effects caused by the ion adsorption/desorption due to the increased interplanar spacing. For example, when the height ratio (b/a) of the peak at $2\theta=26.5°\pm1.0°$ to the peak at $2\theta=23°\pm5.0°$ ranges from about 0.01 to about 0.99, the effects may be further improved, and it may further gain resistance decreasing effects.

A suitable graphite has a single peak at about 26°, so having the XRD property indicates that interplanar spacing of the carbonaceous material is controlled.

The capacitor reactive carbonaceous material according to one embodiment may have interplanar spacing (d002) at or between 0.34 nm and 0.8 nm (or in a range from about 0.335 nm to about 0.8 nm) when X-ray diffraction is measured by using a CuKα ray.

In one embodiment, when the capacitor-reactive carbonaceous material has the interplanar spacing (d002) within the range, it is easy to intercalate and deintercalate anions of the electrolyte salt into the interplanar of carbonaceous material as well as to adsorb and desorb the same into the interplanar spacing.

The capacitor-reactive carbonaceous material is a crystalline carbonaceous material that has a layered structure. Examples of the carbonaceous material include natural graphite, artificial graphite, mesophase carbon microbeads, or a combination thereof. The artificial graphite refers to an artificial graphite obtained through heating a soft carbon at a high temperature of 2500° C. or higher. As the capacitor-reactive carbonaceous material is a crystalline carbonaceous material, and it has an excellent conductivity that is sufficient to maintain a conductive network even if the electrode plate is expanded.

In addition, since the capacitor-reactive carbonaceous material is a crystalline carbon material, it may include fewer cavities than amorphous carbon and thus has high conductivity. Accordingly, since the capacitor-reactive carbonaceous material according to one embodiment of the present invention has interplanar spacing for absorbing/desorbing desolvated ions and can maintain conductivity of a suitable crystalline carbon material, it should have improved or increased or maximized diffusion characteristics.

Also, in one embodiment, the capacitor-reactive carbonaceous material has a tap density at or between 0.5 g/cc and 1.5 g/cc (or of about 0.5 g/cc to about 1.5 g/cc).

The capacitor-reactive carbonaceous material included in the positive electrode according to one embodiment may be prepared in accordance with the following process.

First, a mixture of crystalline carbon and acid is oxidized by adding an oxidizing agent.

The mixture of crystalline carbon and acid may be prepared by mixing crystalline carbon with an acid. The crystalline carbon may include natural graphite, artificial graphite, mesophase carbon microbeads, or a combination thereof. The artificial graphite is soft carbon acquired through heat treatment at 2500° C. or higher.

The acid may include $H_2SO_4$, $HNO_3$, $H_3PO_4$, $H_4P_2O_7$, $H_3AsO_4$, HF, $H_2SeO_4$, $HClO_4$, $CF_3COOH$, $BF_3(CH_3COOH)_2$, $HSO_3F$, $H_5IO_6$, or a combination thereof.

The crystalline carbon and acid are mixed at a weight ratio at or between 1:99 and 50:50 (or in a range from about 1:99 to about 50:50), and in another embodiment at a weight ratio in a range from about 3:97 to about 40:60.

The oxidizing agent may include $KMnO_4$, $NaNO_3$, $KClO_3$, $NaClO_3$, $NH_4ClO_3$, $AgClO_3$, $HClO_3$, $NaClO_4$, $NH_4ClO_4$, $CrO_3$, $NH_{42}S_2O_8$, $PbO_2$, $MnO_2$, $As_2O_5$, $Na_2O_2$, $H_2O_2$, $N_2O_5$, or a combination thereof.

The oxidizing agent may be added 50 to 100 times in an amount from 1 to 15 parts by weight based on 100 parts by weight of crystalline carbon. Accordingly, in one embodiment, the oxidizing agent is entirely included in an amount from 50 to 700 parts by weight based on 100 parts by weight of crystalline carbon. In one embodiment, the oxidizing agent is added in an amount from 1 to 15 parts by weight 10 to 100 times rather than all at once to cause uniform oxidation so that a carbonaceous material can be prepared with more uniform interplanar spacing.

The crystalline carbon is oxidized by adding an oxidizing agent into the mixture and allowed it to stand to be further oxidized. It may be allowed to stand for 1 hour to 300 hours, and it may be appropriately adjusted within the range depending upon the kind of crystalline carbon, but it is not limited thereto.

Next, the oxidized crystalline carbon is dried. The drying may be performed by separating the oxidized crystalline carbon from the acid and the oxidizing agent, and then washing it to improve purity in a shorter time. The drying may be performed at a temperature in a range from 100° C. to 150° C. The drying is performed for a sufficient time to remove moisture from the oxidized crystalline carbon, and has no particular limit.

Then, the dried product is primarily heat-treated under vacuum with a temperature increasing speed in a range from 0.3° C./min to 5.0° C./min to a temperature in a range from 150° C. to 250° C.

The vacuum state may range from 0.01 mbar to 0.1 mbar. When the primary heat treatment is performed under this vacuum degree, gas generated during the heat treatment may be easily discharged and may be partly suppressed from instant generation. Accordingly, a carbonaceous material may be prepared to have a reduced or minimum shape change and controlled interplanar spacing.

The primary heat treatment may be performed for 0.5 to 24.0 hours, which may be adjusted according to vacuum degrees.

When the primary heat treatment is performed under this vacuum degree, the oxidizing agent may be slowly removed, thereby obtaining a carbonaceous material having a desirable interplanar spacing.

The primarily heat-treated product is secondarily heat-treated under an inert atmosphere by increasing with a temperature increasing speed in a range from 5.0° C./min to 10.0° C./min to a temperature in a range from 250° C. to 600° C., and then is maintained at that temperature. The temperature may be maintained for 1 to 24 hours.

The inert atmosphere may include nitrogen, argon, or a combination thereof.

When the heat treatment is gradually and slowly performed at a set or predetermined increasing speed, the acid and the oxidizing agent among layers may be released at a low speed, resultantly preparing a material with high density. In other words, when the heat treatment is performed by instantly increasing to a high temperature (e.g., 900° C.), the acid and an oxidizing agent may be instantly released as gas. Since a crystalline carbon material may thereby have severely expanded interplanar spacing and may be partly broken, it may have an improved surface area but a sharply decreased density. Accordingly, the crystalline carbon material may have a problem of less absorption per unit volume. However, this problem may be prevented by the method according to one embodiment of the present invention.

Furthermore, the method according to one embodiment of the present invention provides a carbonaceous material with excellent conductivity by developing a graphite layer therein through a non-uniform reaction. The carbonaceous material may include a graphite layer including both a perfect graphite crystal layer and an expanded gap between the layers (2 phases). When the double-phased crystalline composite graphite is prepared by effectively controlling an interplanar spacing of graphite, two significant peaks are shown at $2\theta=26.5°$ and between 10° and 26.5° measured through XRD diffraction.

The positive electrode includes a positive active material layer and a current collector supporting the positive active material layer. The positive active material includes lithiated intercalation compounds that reversibly intercalate and deintercalate lithium ions. The positive active material may include a composite oxide including at least one selected from the group consisting of cobalt, manganese, and nickel, as well as lithium.

In particular, the following lithium-containing compounds may be used. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.05$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); or $LiFePO_4$ In the above formulae, A is selected from the group consisting of Ni, Co, Mn, or a combination thereof; X is selected from the group consisting of Al, Ni, Co, Mn, Cr, Fe, Mg, Sr, V, a rare earth element, or a combination thereof; D is selected from the group consisting of O, F, S, P, or a combination thereof; E is selected from the group consisting of Co, Mn, or a combination thereof; T is selected from the group consisting of F, S, P, or a combination thereof; G is selected from the group consisting of Al, Cr, Mn, Fe, Mg, La, Ce, Sr, V, or a combination thereof; Q is selected from the group consisting of Ti, Mo, Mn, or a combination thereof; Z is selected from the group consisting of Cr, V, Fe, Sc, Y, or a combination thereof; and J is selected from the group consisting of V, Cr, Mn, Co, Ni, Cu, or a combination thereof.

The compound may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxylcarbonate of a coating element. The compound for a coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed in a method having no adverse influence on properties of a positive active material by including these elements in the compound. For example, the method may include any coating method such as spray coating, dipping, or the like.

The positive active material layer also includes a binder and a conductive material.

The binder improves binding properties of the positive active material particles to one another, and also with a current collector. Examples of the binder include polyvinyl alcohol, carboxylmethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material is included to improve electrode conductivity. It may include any electrically conductive material, unless it causes a chemical change. Examples of the conductive material include carbon-based materials such as natural graphite, artificial graphite, carbon black, acetylene black, ketjen black, carbon fiber, or the like; metal-based materials such as a metal powder, a metal fiber, or the like including copper, nickel, aluminum, silver, etc.; a conductive polymer such as a polyphenylene derivative; or a mixture thereof.

The current collector may include Al, but is not limited thereto.

In the positive electrode according to one embodiment, the positive active material may be mixed with a capacitor-reactive carbonaceous material in a weight ratio of about 99:1 to about 50:50, for example, in a weight ratio of about 97:3 to about 60:40. When the positive active material is mixed with the capacitor-reactive carbonaceous material within the range, it may suppress the electrolyte solution decomposition and suppress the gas ventilation while appropriately maintaining the capacity. In addition, in the positive electrode according to one embodiment of the present invention, the mixed weight of the positive active material and the capacitor-reactive carbonaceous material is about 80 wt % to about 98 wt %, the binder may be added to be in a range from about 1 wt % to about 10 wt %, and the conductive material may be added to be in a range from about 1 wt % to about 10 wt %.

The negative and positive electrodes may be fabricated by a method including mixing the active material and a binder, and optionally a conductive material, to provide an active material composition, and coating the composition on a current collector. The electrode is manufactured with a suitable method. The solvent includes N-methylpyrrolidone or the like, but is not limited thereto.

A rechargeable lithium battery according to another embodiment of this disclosure includes a positive electrode, a negative electrode, and an electrolyte. The electrolyte includes a non-aqueous organic solvent and a lithium salt.

The negative electrode includes a negative active material layer including a negative active material and a current collector supporting the same. The negative active material includes a material capable of reversibly intercalating/deintercalating lithium ions, a lithium metal, a metal alloy of lithium, a material capable of doping and dedoping lithium, or a transition metal oxide.

The material capable of reversibly intercalating/deintercalating lithium ions may include any carbonaceous material, which includes any carbonaceous negative active material generally used for a rechargeable lithium battery. The representative example of carbonaceous material may include crystalline carbon, amorphous carbon, or a mixture thereof. Non-limiting examples of the crystalline carbon include graphite such as amorphous, sheet-type, flake-type, spherical, or fibrous natural graphite or artificial graphite, and examples of the amorphous carbon include soft carbon or hard carbon, mesophase pitch carbide, and fired coke.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material capable of doping and dedoping lithium include Si, $SiO_x$ ($0<x<2$), a Si-Q alloy (where Q is an element selected from the group consisting of an alkaline metal, an alkaline-earth metal, a group 13 element, a group 14 element, a transition element, a rare earth element, and combinations thereof, and is not Si), Sn, $SnO_2$, a Sn—R alloy (where R is an element selected from the group consisting of an alkaline metal, an alkaline-earth metal, a group 13 element, a group 14 element, a transition element, a rare earth element, and combinations thereof, and is not Sn), and mixtures thereof. At least one of these materials may be mixed with $SiO_2$. The elements Q and R are the same or different, and are independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

Examples of the transition metal oxide include vanadium oxide, lithium vanadium oxide of the following Chemical Formula 1 or 2, or lithium titanium oxide of the following Chemical Formula 3.

$$Li_{x1}V_{y1}M_{d1}O_{2+e1}$$ Chemical Formula 1

In Chemical Formula 1, $1 \le x1 \le 2.5$, $0.5 \le y1 \le 1.5$, $0 \le d1 \le 0.5$, $0 \le e1 \le 0.5$, and M is Mg, Al, Cr, Mo, Ti, W, Zr, Si, Sc, Cu, Zu, Nb, Y, or a combination thereof.

$$Li_{x2}M'_{y2}V_{2-y2}O_{6-z2}$$ Chemical Formula 2

In Chemical Formula 2, $0 \le x2 \le 1.2$, $0 \le y2 \le 2$, $-2 \le z2 \le 2$, and M' is Mo, Mn, Co, Ni, or a combination thereof.

$$Li_{x3}Ti_{y3-z3}M''_{z3}O_{4-z4}$$ Chemical Formula 3

In Chemical Formula 3, $0.6 \le x3 \le 2.5$, $1.2 \le y3 \le 2.3$, $0 \le z3 \le 0.5$, $0 \le z4 \le 0.5$, and M'' is V, Cr, Nb, Fe, Ni, Co, Mn, W, Al, Ga, or a combination thereof.

The negative active material layer of a negative electrode may include about 95 wt % to about 99 wt % of a negative active material based on the total weight of the negative active material layer.

The negative active material layer may include a binder, and may optionally further include a conductive material. The negative active material layer may include about 1 wt % to about 5 wt % of a binder based on the total weight of the negative active material layer. In addition, when the negative active material layer further includes a conductive material, it may include about 90 wt % to about 98 wt % of the negative active material, about 1 wt % to about 5 wt % of the binder, and about 1 wt % to about 5 wt % of the conductive material.

The binder improves properties for binding active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the binder.

The conductive material is included to improve electrode conductivity. It may include any electrically conductive material, unless it causes a chemical change. Examples of the conductive material include carbon-based materials such as natural graphite, artificial graphite, carbon black, acetylene black, ketjen black, carbon fiber, or the like; metal-based materials such as a metal powder, a metal fiber, or the like including copper, nickel, aluminum, silver, etc.; a conductive polymer such as a polyphenylene derivative; or a mixture thereof.

The negative electrode may be fabricated by a method including mixing the negative active material, a conductive material, and a binder to provide an active material composition, and coating the composition on a current collector. The electrode is manufactured with a suitable method.

The solvent may be N-methylpyrrolidone, but it is not limited thereto. In addition, when the binder is a water-soluble binder, the solvent may include water.

The current collector may be selected from a copper foil, a nickel foil, a stainless steel foil, a titanium foil, a nickel foam, a copper foam, a polymer substrate coated with a conductive metal, or a combination thereof.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based solvent, an ester-based solvent, an ether-based solvent, a ketone-based solvent, an alcohol-based solvent, or an aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, or the like, and examples of the ketone-based solvent include cyclohexanone or the like. Examples of the alcohol-based solvent include ethyl alcohol, isopropyl alcohol, or the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio may be controlled in accordance with a desirable battery performance.

The carbonate-based solvent may be prepared by mixing a cyclic carbonate and a linear carbonate. In this case, the cyclic carbonate may be mixed with the linear carbonate in an appropriate mixing ratio, for example, they may be mixed in a volume ratio range of about 9:1 to about 1:9 to about 1:1 to about 1:9, but is not limited thereto.

In addition, the non-aqueous organic electrolyte may be further prepared by mixing a carbonate-based solvent with an aromatic hydrocarbon-based solvent. The carbonate-based solvent may be mixed with the aromatic hydrocarbon-based organic solvent in an appropriate ratio, for example in a volume ratio of about 1:1 to 30:1, but is not limited thereto.

The aromatic hydrocarbon-based organic solvent may be represented by the following Chemical Formula 4.

Chemical Formula 4

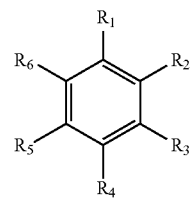

In Chemical Formula 4, $R_1$ to $R_6$ are independently selected from the group consisting of hydrogen, a halogen, a C1 to C10 alkyl group, a C1 to C10 haloalkyl group, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include an additive of vinylene carbonate, an ethylene carbonate-based compound represented by the following Chemical Formula 5, or a combination thereof in order to improve cycle-life.

Chemical Formula 5

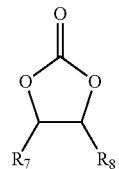

In Chemical Formula 5, $R_7$ and $R_8$ are independently selected from the group consisting of hydrogen, a halogen, a cyano group (CN), a nitro group ($NO_2$), and a C1 to C5 fluoroalkyl group, provided that at least one of $R_7$ and $R_8$ is selected from the group consisting of a halogen, a cyano group (CN), a nitro group ($NO_2$), and a C1 to C5 fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. The amount of the additive used to improve cycle life may be adjusted within an appropriate range.

The lithium salt is dissolved in an organic solvent, supplies lithium ions in a battery, operates a basic operation of the rechargeable lithium battery, and improves lithium ion transportation between positive and negative electrodes therein. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (x and y are natural numbers), LiCl, LiI, or $LiB(C_2O_4)_2$ (lithium bis(oxalato) borate; LiBOB). The lithium salt may be used in a concentration in a range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

The following examples illustrate this disclosure in more detail. However, the following are exemplary embodiments and are not limiting.

Example 1

An artificial graphite of mesophase carbon microbeads (MCMB) (manufactured with heat treatment at 2800° C.) is mixed with an acid.

The acid is prepared by mixing concentrated sulfuric acid (concentration: 98 volume %) with nitric acid (concentration: 63 volume %) in a volume ratio of 1:3. The MCMB is mixed with acid in a weight ratio of 1:27.

An oxidizing agent of potassium permanganate is added into the mixture. The potassium permanganate is added at 5 parts by weight based on 100 parts by weight of MCMB 100 times, so the total adding amount of potassium permanganate is 500 parts by weight based on 100 parts by weight of MCMB.

The resultant product is allowed to stand for 48 hours. The sulfuric acid is added to the interplanar structure of MCMB to oxidize the MCMB.

After completing the reaction, the product is filtrated to provide an oxidized MCMB and washed using distilled water until neutralized.

The washed product is sufficiently dried in a 120° C. drying oven to remove moisture. The oxidized MCMB is primarily heat-treated by increasing a temperature to 150° C. with a temperature increasing speed of 2° C./min while maintaining the vacuum degree of 0.05 mbar. The primarily heat-treated product is secondarily heat-treated by increasing a temperature to 250° C. with a temperature increasing speed of 5° C./min or less and maintained for 12 hours at that temperature while injecting nitrogen at 10 mL/min.

Accordingly, the above process produces a capacitor-reactive carbonaceous material that is a crystalline carbonaceous material with controlled interplanar spacing. The obtained capacitor-reactive carbonaceous material has a specific surface area of 21.8 $m^2/g$. The increased interplanar spacing d002 is 0.404 nm when measured using a CuKα ray, and the ratio (b/a) of the peak height (b) at 2θ=26° to the peak height (a) at 2θ=23.5° is about 0.55.

Example 2

A positive active material of $LiCoO_2$, the capacitor-reactive carbonaceous material obtained from Example 1, a conductive material of carbon black, and a binder of polyvinylidene fluoride dissolved in N-methylpyrrolidone solvent are mixed to provide an active material slurry. The mixed weight of active material and capacitor-reactive carbonaceous material, the weight of conductive material, and the weight of binder are respectively 85 wt %, 5 wt %, and 10 wt %, and the active material and the capacitor-reactive carbonaceous material are mixed in a weight ratio of 80:20.

The slurry is coated on a copper current collector to provide a positive electrode.

A negative active material of soft carbon, a conductive material of carbon black, and a binder of polyvinylidene fluoride are mixed in a N-methylpyrrolidone solvent in a weight ratio of 8:1:1 to provide a negative active material slurry. The negative active material slurry is coated on a copper current collector and dried at 120° C. to provide a negative electrode.

A 200 mAh pouch type half-cell is then fabricated using the positive electrode, the negative electrode, and an electrolyte solution. The electrolyte solution is prepared by dissolving a $LiPF_6$ lithium salt in a mixed solvent of ethylene carbonate, dimethyl carbonate, and diethyl carbonate (3:3:1 volume ratio).

Example 3

A half-cell is fabricated by the same procedure as in Example 2, except that the active material and the capacitor-reactive carbonaceous material are mixed in a weight ratio of 20:80.

Comparative Example 1

A positive active material of $LiCoO_2$, a conductive material of carbon black, and a binder of which polyvinylidene fluoride is dissolved in an N-methylpyrrolidone solvent are mixed to provide an active material slurry. The weights of active material, conductive material, and binder are 85 wt %, 5 wt %, and 10 wt %, respectively.

The slurry is coated on a copper current collector to provide a positive electrode.

A 200 mAh pouch type half-cell is then fabricated using the positive electrode, a lithium metal counter electrode, and an electrolyte solution. The electrolyte solution is prepared by dissolving a $LiPF_6$ lithium salt in a mixed solvent of ethylene carbonate, dimethyl carbonate, and diethyl carbonate (3:3:1 volume ratio).

Comparative Example 2

A half-cell is fabricated in accordance with the same procedure as in Example 2, except that the positive electrode is provided with expanded graphite having an interplanar spacing of 0.336 nm instead of the capacitor-reactive carbonaceous material obtained from Example 1.

The capacitor-reactive carbonaceous material obtained from Example 1, the carbon black, and the expanded graphite are measured for physical properties, and the results are shown in the following Table 1.

TABLE 1

|  | Interplanar spacing, d002 (nm) | Tap density (g/cm³) | Specific surface area (m²/g) |
| --- | --- | --- | --- |
| Example 1 | 0.404 | 1.1 | 21.8 |
| Carbon black | 0.356 | 0.08 | 84 |
| Expanded graphite | 0.338 | 0.03 | 213 |

As shown in Table 1, the capacitor-reactive carbonaceous materials obtained from Example 1 have a very small specific surface area and a wide interplanar spacing compared to the expanded graphite.

Since the expanded graphite is prepared by instantly and rapidly removing gas at a high temperature, the specific surface area is very much increased, but the interplanar spacing is within the general range of graphite. Resultantly, the tap density is decreased. As shown in Table 1, the expanded graphite has a very low tap density compared to Example 1.

Carbon black is a material having very low interplanar spacing, tap density, and specific surface area compared to those of Example 1.

Each half-cell obtained from Examples 2 and 3 and Comparative Examples 1 and 2 is charged and discharged to 2.5 to 4.9 V to determine the basic performance of a battery. It is full-charged at a low rate of 0.5 C after discharging on the basis of capacity of initial 1 C, and then it is charged and discharged by varying the charge and discharge rate to 1 C, 5 C, 10 C, 20 C, and 50 C.

Charge capacity is measured according to the charge and discharge to calculate the charge capacity percent (%) at 5 C, 10 C, 20 C, and 50 C to 1 C, respectively. The results are shown in the following Table 2 as a charge characteristic. In addition, the cycle-life is determined as a percent value of discharge capacity after the charge and discharge at 10 C for 100 times to the discharge capacity after the charge and discharge at 10 C for one time, and the results are shown in the following Table 2.

TABLE 2

|  | Charge characteristic (%) | | | | Cycle-life |
| --- | --- | --- | --- | --- | --- |
|  | 5 C/1 C | 10 C/1 C | 20 C/1 C | 50 C/1 C | (%) |
| Example 2 | 96 | 84 | 80 | 65 | 91 |
| Example 3 | 94 | 81 | 78 | 67 | 88 |
| Comparative Example 1 | 78 | 19 | 5 | 3 | 3 |
| Comparative Example 2 | 84 | 24 | 13 | 6 | 3 |

As shown in Table 2, it can be derived that the half cells obtained from Examples 2 and 3 have superior charge characteristics, and particularly superior high-rate characteristics to those of Comparative Examples 1 and 2.

This is caused by the capacitor-reactive carbonaceous material for a half cell according to each Examples 2 and 3 having a wide interplanar spacing and fast ion transportation to provide the environment for maintaining a sufficient electrolyte around the positive active material, so that it can facilitate the intercalation/deintercalation of ions.

In the case of using an expanded graphite having a very narrow interplanar spacing according to Comparative Example 2, it is difficult to sufficiently intercalate/deintercalate cations of lithium salts included in the electrolyte, and it is also difficult to contribute the ion charge and discharge behavior of positive active material besides the conductive effects due to the large specific surface area, so it can be derived that the charge characteristic and the cycle-life characteristic are unsatisfactory. The results are the same as in Comparative Example 1 including an excessive amount of carbon black that does not contribute to high power besides the conductivity.

In an embodiment of the present invention, a rechargeable lithium battery 1 is provided which includes a positive electrode 2 as described above. That is, as shown in the FIGURE, the rechargeable lithium battery 1 includes the positive electrode 2, a negative electrode 3 and a separator 4 positioned between the positive electrode 2 and the negative electrode 3. The positive electrode 2, the negative electrode 3 and the separator 4 are wound together to form an electrode assembly. The electrode assembly is enclosed within a battery case 5 with an electrolyte, and is sealed with a cap assembly 6.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the above-mentioned embodiments are exemplary but do not limit in any sense.

What is claimed is:

1. A positive electrode for a rechargeable lithium battery, comprising:
   a positive active material; and
   a capacitor-reactive carbonaceous material having a specific surface area at or between about 10 m²/g and about 100 m²/g,
   wherein the capacitor-reactive carbonaceous material shows a peak at 2θ=23°±5.0° and an other peak at 2θ=26.5°±1.0°, and
   wherein the peak at 2θ=23°±5.0° is higher than the other peak at 2θ=26.5°±1.0°.

2. The positive electrode of claim 1, wherein the capacitor-reactive carbonaceous material has a height ratio (b/a) at or between about 0.01 and about 0.99, and wherein b is a peak height of the other peak at 2θ=26.5°±1.0°, and a is a peak height of the peak at 2θ=23°±5.0°.

3. The positive electrode of claim 1, wherein the capacitor-reactive carbonaceous material has interplanar spacing d002 at or between about 0.34 nm and about 0.8 nm when its X-ray diffraction is measured using a CuKα ray.

4. The positive electrode of claim 1, wherein the capacitor-reactive carbonaceous material has a tap density at or between about 0.5 g/cc and about 1.5 g/cc.

5. The positive electrode of claim 1, wherein the positive active material and the capacitor-reactive carbonaceous material are mixed in a weight ratio at or between about 99:1 and about 50:50.

6. The positive electrode of claim 1, wherein the capacitor-reactive carbonaceous material is natural graphite, artificial graphite, mesophase carbon microbeads, or a combination thereof.

7. The positive electrode of claim 1, wherein the positive electrode is configured to allow the rechargeable lithium battery to have an operation voltage at about 4.5V or more.

8. The positive electrode of claim 1, wherein the positive electrode is configured to allow the rechargeable lithium battery to have a working voltage at or between about 4.5V and about 5.0V.

9. A high voltage rechargeable lithium battery comprising:
a positive electrode comprising a positive active material and a capacitor-reactive carbonaceous material having a specific surface area at or between about 10 m$^3$/g and about 100 m$^2$/g;
a negative electrode; and
an electrolyte between the positive electrode and the negative electrode,
wherein the capacitor-reactive carbonaceous material shows a peak at 2θ=23°±5.0° and an other peak at 2θ=26.5°±1.0°, and
wherein the peak at 2θ=23°±5.0° is higher than the other peak at 2θ=26.5°±1.0°.

10. The high voltage rechargeable lithium battery of claim 9, wherein the capacitor-reactive carbonaceous material has a height ratio (b/a) at or between about 0.01 and about 0.99, and wherein b is a peak height of the other peak at 2θ=26.5°±1.0°, and a is a peak height of the peak at 2θ=23°±5.0°.

11. The high voltage rechargeable lithium battery of claim 9, wherein the capacitor-reactive carbonaceous material has interplanar spacing d002 at or between about 0.34 nm and about 0.8 nm when its X-ray diffraction is measured using a CuKα ray.

12. The high voltage rechargeable lithium battery of claim 9, wherein the capacitor-reactive carbonaceous material has a tap density at or between about 0.5 g/cc and about 1.5 g/cc.

13. The high voltage rechargeable lithium battery of claim 9, wherein the positive active material and the capacitor-reactive carbonaceous material are mixed in a weight ratio at or between about 99:1 and about 50:50.

14. The high voltage rechargeable lithium battery of claim 9, wherein the capacitor-reactive carbonaceous material is natural graphite, artificial graphite, mesophase carbon microbeads, or a combination thereof.

15. The high voltage rechargeable lithium battery of claim 9, wherein the high voltage rechargeable lithium battery has an operation voltage at about 4.5V or more.

16. The high voltage rechargeable lithium battery of claim 9, wherein the high voltage rechargeable lithium battery has a working voltage at or between about 4.5V and about 5.0V.

17. The positive electrode of claim 1, wherein the capacitor-reactive carbonaceous material comprises a vacuum heat-treated, oxidized carbon material.

18. The high voltage rechargeable lithium battery of claim 9, wherein the capacitor-reactive carbonaceous material comprises a vacuum heat-treated, oxidized carbon material.

* * * * *

UNITED STATES PATENT AND TRADEMARK OFFICE
CERTIFICATE OF CORRECTION

PATENT NO. : 8,852,809 B2
APPLICATION NO. : 13/094717
DATED : October 7, 2014
INVENTOR(S) : Kyeu-Yoon Sheem et al.

It is certified that error appears in the above-identified patent and that said Letters Patent is hereby corrected as shown below:

In the Claims

Col. 15, line 8, Claim 9    Delete "$10 \text{ m}^3/\text{g}$",

Insert --$10 \text{ m}^2/\text{g}$--

Signed and Sealed this
Sixteenth Day of August, 2016

Michelle K. Lee
*Director of the United States Patent and Trademark Office*